Oct. 8, 1957 — M. F. MORAN — 2,808,655
INTERNAL PITCH DIAMETER GAGE
Filed Dec. 30, 1953

*INVENTOR:*
M. F. MORAN
BY C. B. Hamilton
ATTORNEY

2,808,655

INTERNAL PITCH DIAMETER GAGE

Martin F. Moran, Indianapolis, Ind., assignor to Western Electric Company, Incorporated, New York, N. Y., a corporation of New York Application December 30, 1953, Serial No. 401,205

4 Claims. (Cl. 33—199)

This invention relates to gages, and more particularly to gages for measuring pitch diameters of internally threaded cup-shaped articles.

An object of the invention is to provide new and improved gages.

Another object of the invention is to provide new and improved gages for measuring the pitch diameters of internally threaded cup-shaped articles.

A further object of the invention is to provide simple, accurate and inexpensive gages for measuring the internal pitch diameters of cup-shaped articles.

A gage illustrating certain features of the invention may include a base, a pair of thread segments fixed to the base in positions which are spaced apart a predetermined distance less than the nominal diameter of a cup-shaped article having internal threads, and means mounted on the base for measuring movement of the article as it is slid from one thread segment to the other.

Figure 1:
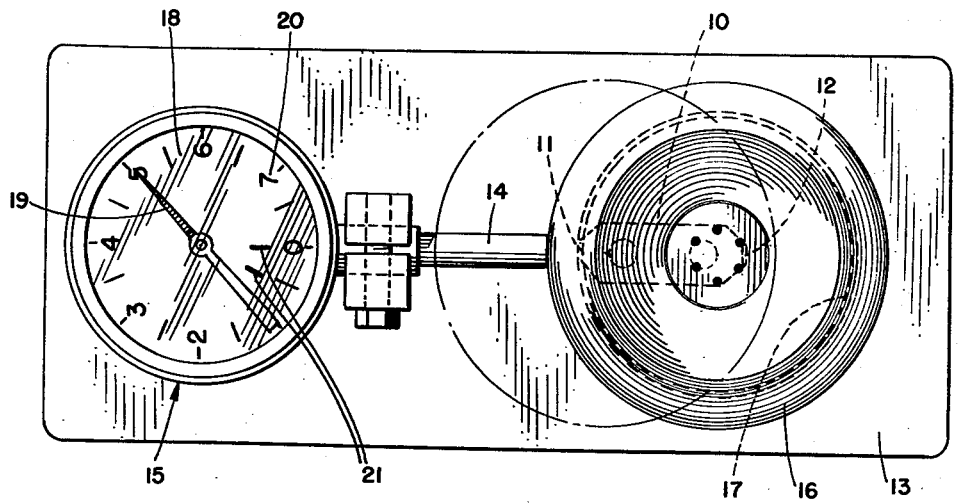
Figure 2:
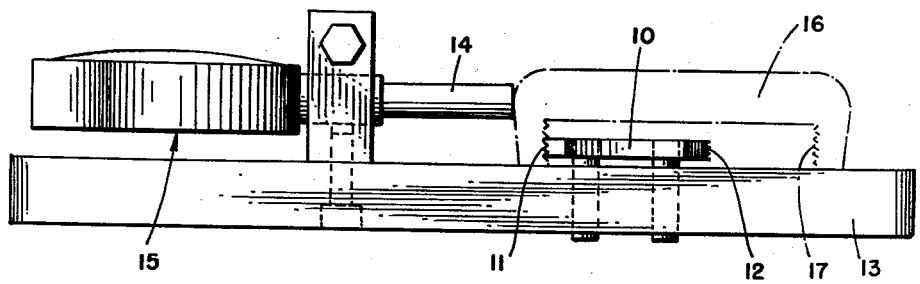

A complete understanding of the invention may be obtained from the following detailed description of a gage forming a specific embodiment thereof, when read in conjunction with the appended drawing, in which Fig. 1 is a top plan view of a gage forming one embodiment of the invention, and Fig. 2 is a front elevation of the gage shown in Fig. 1.

Referring now in detail to the drawing, there is shown therein a bar 10 having thread segments 11 and 12 on opposite ends thereof which form segments of a pitch diameter of a predetermined distance. The bar is mounted in a raised position on a base 13 in alignment with a plunger 14 of a dial indicator gage 15 fastened to the base 13. A cap 16, which may be a telephone transmitter cap, or the like, is provided with an internal thread 17 whose pitch diameter is to be measured, the desired value of the pitch diameter being a predetermined distance greater than the pitch diameter of the thread segments 11 and 12 on the bar 10. The thread segments 11 and 12 are the same in size and type as the thread 17, and are at such a height as to mesh easily with the thread 17. The dial indicator gage is provided with a dial 18, a pointer 19 and a scale 20 on the dial, which includes allowable limit lines 21.

To test the cap 16, it is placed over the bar 10 with the rim of the cap in engagement with the base 13, and the cap is moved into engagement with the thread segment 11 in which position the pointer 19 points toward zero on the dial 18 of the dial indicator gage 15. The cap 16 then is slid, without turning the cap, toward the left, as viewed in Fig. 1, to move the threads 17 out of engagement with the thread segment 11 and into engagement with the thread segment 12. This moves the plunger 14 of the gage to the left to move the pointer 19 in a clockwise direction, a distance proportional to the movement of the plunger 14. Since the distance between the thread segments 11 and 12 is known, the distance which the cap 16 is moved from engagement with the thread segment 11 to engagement with the thread segment 12 added to the length or pitch diameter of the bar 10 gives the pitch diameter of the thread 17, and the limit lines 21 indicate minimum and maximum pitch diameters for the cap 16. The cap 16 may be checked around several points of the internal periphery thereof to check the concentricity of the thread 17 and the cap 16.

The above-described apparatus is simple, quick and accurate in construction and operation to measure the internal pitch diameter of the cap 16, and also checks the concentricity of the cap 16. Obviously, the apparatus described hereinabove may be adapted to check external pitch diameter by providing opposed thread segments of a pitch diameter greater than the pitch diameter of the article to be checked and then moving the article back and forth between these opposed thread segments and measuring the distance which it is moved.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A gage for checking pitch diameters, which comprises a base, a pair of thread segments mounted on the base a predetermined distance apart facing in opposite directions, so arranged and constructed that a round article to be tested may be moved alternately into engagement with the thread segments, and means for measuring the distance of movement of the article as it is so moved.

2. A gage for checking pitch diameters, which comprises a base, a pair of thread segments mounted on the base a predetermined distance apart in positions facing away from one another, so arranged and constructed that a round article to be tested may be moved alternately into engagement with the thread segments, and means responsive to movement of said round article for measuring the distance of movement of the article as it is so moved.

3. A gage for measuring the internal pitch diameter of an article, which comprises a base, a bar having thread segments of a predetermined pitch diameter formed on the ends thereof secured to the base in a position spaced from the base over which a cup-shaped article having an internally threaded portion of a pitch diameter greater than that of the thread segments on the bar may be placed and alternately moved into engagement with the thread segments on the ends of the bad, and a dial indicator gage mounted on the base in a position in which it engages the cup-shaped article and indicates the displacement of the article between alternate positions of the article.

4. A gage for measuring the internal pitch diameter of an article, which comprises a base, a bar having thread segments of a predetermined pitch diameter formed on the ends thereof, means securing the bar to the base in an elevated position spaced from the base over which a cup-shaped article having an internally threaded portion of a pitch diameter greater than that of the thread segments on the bar may be placed and alternately moved into engagement with the thread segments on the ends of the bar, a dial indicator gage, and means mounting the dial indicator gage on the base in a position in which a plunger of the gage engages the cup-shaped article and measures the displacement of the article between alternate positions of the article.

References Cited in the file of this patent

UNITED STATES PATENTS

| | | |
|---|---|---|
| 1,090,180 | Wells et al. | Mar. 17, 1914 |
| 2,290,045 | Harley et al. | July 14, 1942 |
| 2,419,263 | Hohwart | Apr. 22, 1947 |
| 2,636,379 | Van Dorn | Apr. 28, 1953 |
| 2,746,159 | Aller | May 22, 1956 |